W. T. HENDERSON.
MOUNTING.
APPLICATION FILED JULY 29, 1916.

1,259,015.

Patented Mar. 12, 1918.
2 SHEETS—SHEET 1.

Inventor
William T. Henderson
By Horatio E. Bellows
Attorney

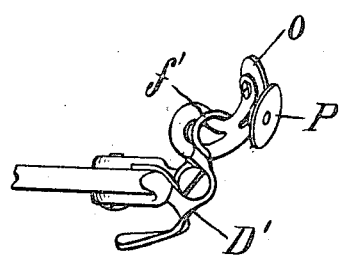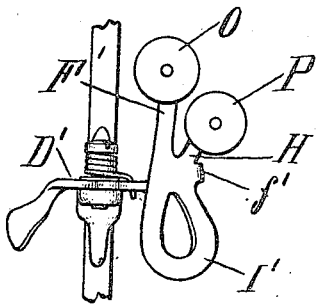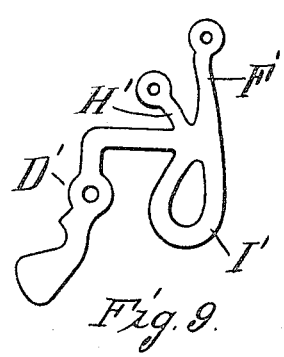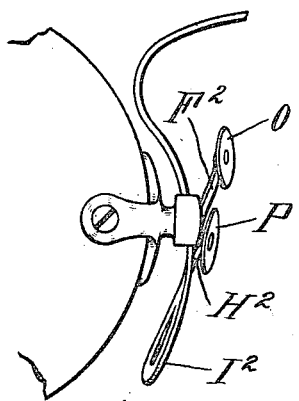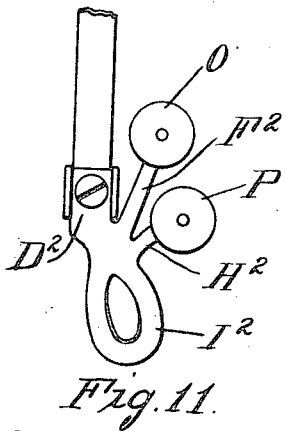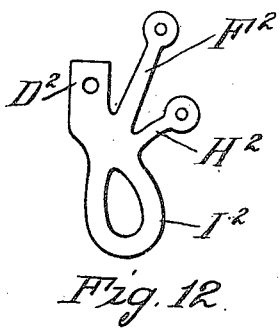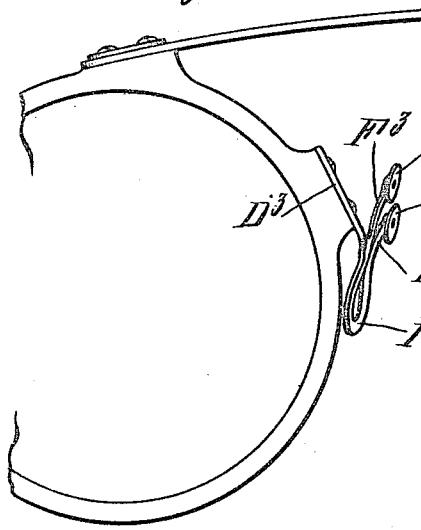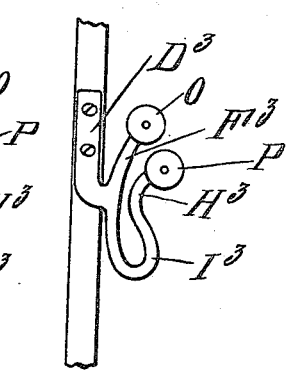

UNITED STATES PATENT OFFICE.

WILLIAM T. HENDERSON, OF OKLAHOMA, OKLAHOMA.

MOUNTING.

1,259,015.  Specification of Letters Patent.  Patented Mar. 12, 1918.

Application filed July 29, 1916. Serial No. 112,128.

*To all whom it may concern:*

Be it known that I, WILLIAM T. HENDERSON, a citizen of the United States, residing at Oklahoma, in the county of Oklahoma and State of Oklahoma, have invented certain new and useful Improvements in Mountings, of which the following is a specification.

My invention relates to mountings for eyeglasses and spectacles, and the essential objects of the invention are to enable a construction from a stamped out and bent blank; to apply to the nose area, heretofore covered by a one pad guard, two pads, and to so dispose the same as to distribute the pressure of the guard upon the nose; to add to the comfort of the wearer; to increase the clinging properties of the guard; to afford facile adjustment of the parts independently of each other to fit the anatomy of the nose; and to attain these results in a simple and inexpensive structure.

To the above enumerated ends essentially my invention consists in such parts and combinations of parts as fall within the scope of the appended claims.

Figure 1:
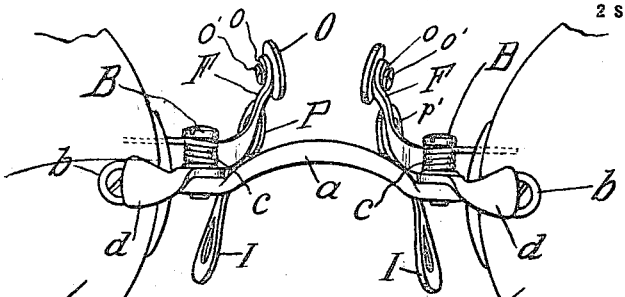
Figure 2:
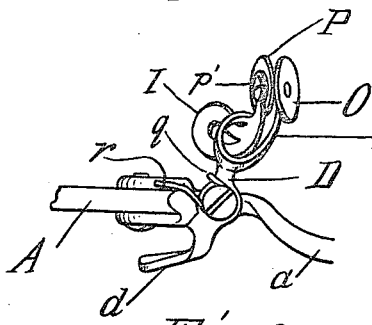
Figures 3, 4:
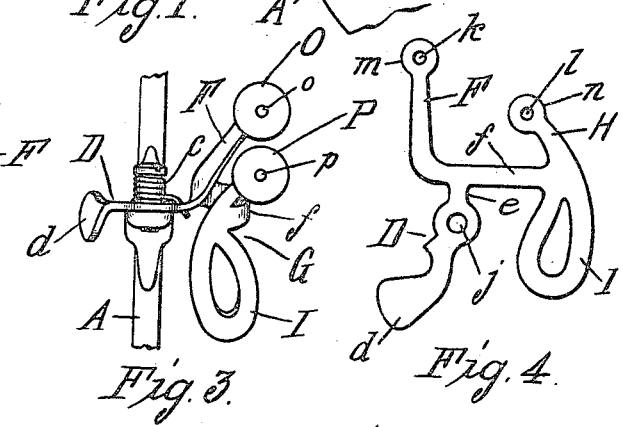
Figure 5:
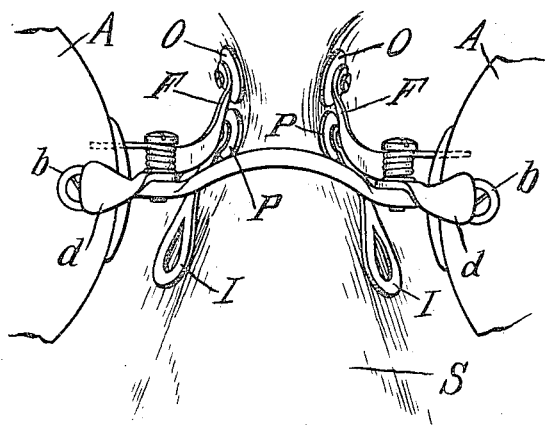
Figure 6:
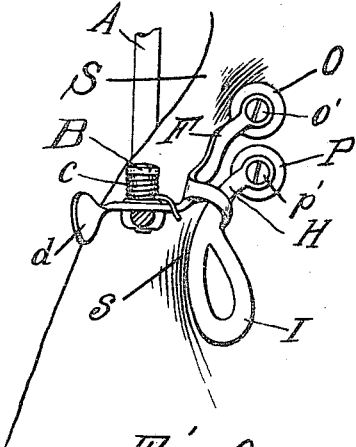

In the accompanying drawings which form a part of this specification,

Figure 1 is a front elevation of a pair of eyeglasses or spectacles with portions of the lenses broken away, Figs. 2 and 3, plan and face views of one of the guards, Fig. 4, a plan of a blank from which the guard is ultimately bent, Figs. 5 and 6, front and side elevations respectively of a nose with my mounting engaged therewith, Figs. 7 and 8, plan and face views respectively of a modified form of my invention, Fig. 9, a detail view of the original blank of the same, Figs. 10 and 11, front and face views respectively of another modified view of my invention, Fig. 12, a detail of the blank from which the same is formed, Figs. 13 and 14, a front elevation and face view respectively of another modified form of my invention, and Fig. 15, a detail of the blank from which the same is formed.

Like reference characters indicate like parts throughout the views.

In the drawings A are the lenses, $a$ the bridge or bow, $b$ the straps, B the posts, and $c$ the springs of a pair of spectacles or eyeglasses of the finger piece type. Each mounting comprises, in this instance, a lever arm D having a thumb piece $d$ and flat intermediate portion $e$ having at its rear end an upwardly and rearwardly inclined arm F whose lower end is integral with a downwardly inclined rearwardly directed loop $f$ terminating in an intermediate portion of a second member G comprising an upwardly and rearwardly directed arm H disposed at an angle to the arm F and in contact with or adjacent the lower portion of the latter and lying in substantially the same plane transversely of the lenses with the arm F, but somewhat shorter with its free end below the end of the latter. Integral with the arm H is an oblong downwardly directed loop or Plate I which constitutes the lower portion of member G and is adapted to bear against the side of the nose. The guard is cut from a flat sheet of thin metal into the form of blank shown in Fig. 4, with a hole or piercing in the member D adapted to receive the post, and with perforations $k$ and $l$ in the enlarged ends $m$ and $n$ of the arms F and H respectively. These perforations are adapted to receive the shanks $o$ and $p$ respectively of the contact members or pads O and P. These shanks are loose in the perforations and somewhat longer than the thickness of the material of the arms, and are held against escape by the heads $o'$, $p'$, upon their respective free ends. The shanks or heads $o$ and $p$ have their other ends riveted or otherwise fixed in the pads. The described pads are, therefore, movable or rocking.

The guard, while pliable, is of metal having a suitable degree of resiliency so as to lend itself to adjustment by bending.

The operation of the guard shown in Figs. 1 to 9 inclusive is by manipulation of the finger piece $d$ in coöperation with the spring $c$ whose ends $q$ and $r$ engage the lever arm D and strap $b$ respectively.

By reference to Figs. 5 and 6 it will be seen that when the guard is applied to the nose the pads O and P automatically adjust themselves to the anatomy of the nose, the pad O resting under the orbit to prevent tipping of the glasses when bending forwardly, and the pad P preventing the mounting from working off the nose. The two pads combine to prevent escape of the guard when the skin is moved up or down, as in the act of sneezing or laughing. The loop portion I of the guard supports the weight of the lenses and mounting, and rests back of the bony portion s of the nose S, thus preventing a tipping out of the mounting when the wearer bends forward.

The above described functions are true also of the modified forms of my invention.

Figs. 7 to 9 inclusive show the operating arm D' provided at its end with a loop f' connected with the bearing portion I' at the base of the arm H'. The longer arm F' is continuous with the portion I'.

For use in a box mounting the form of my guard is preferably that shown in Figs. 10 to 12 inclusive. The vertical supporting arm or lug $D^2$ is offset from the upper portion of the part $I^2$, while the inclined arms $F^2$ and $H^2$ are at different vertical inclinations relatively to the member $I^2$ and their pads are not in exactly the same vertical plane.

In some mountings the form of my guard shown in Figs. 13 to 15 inclusive is preferable. The supporting arm $D^3$ is somewhat longer and is provided with a plurality of perforations $j$. The lower end of this arm is intended to form a support for the guard portion $I^3$ having its upper portions extended to form the arms $F^3$ and $H^3$.

It is immaterial whether the supporting or attaching member or arm of my guard be a pivoted member as D and D' or whether it be a fixed member as $D^2$ and $D^3$. In any of its forms my guard is bendably adjustable throughout including the attaching member, the pad supporting arms, and the loops.

The nose bearing plate or body portion of my guard may be a closed loop I, an open loop $I^3$, or an imperforate plate.

I claim:—

1. A nose guard of pliable material independent of and bodily revolubly movable with relation to the bridge and comprising in a single piece a nose bearing body plate, a lateral attaching arm and bearing arms upon the upper portion of the body plate adjacent the base of the attaching arm, said bearing arms extending in an upward direction and yieldably connected.

2. A nose guard of pliable material independent of and bodily revolubly movable with relation to the bridge and comprising in a single piece a nose bearing body plate, a lateral attaching arm and bearing arms upon the upper portion of the body plate adjacent the base of the attaching arm, said bearing arms extending in an upward direction and yieldably connected, said bearing arms being of different lengths.

3. A nose guard of pliable material comprising a nose bearing plate, an attaching arm upon the plate, diverging arms adjacent each other one at the base of the attaching arm, said bearing arms being connected by a loop disposed transversely of their length and extending from the base of the attaching arm.

4. A nose guard of pliable material comprising in a single piece, independent of the bridge, a flat nose bearing body plate, a lateral attaching arm, a flat upright bearing arm above the attaching arm, a second flat bearing arm adjacent the base of the first-named bearing arm and of less length than said first-named bearing arm and rearwardly inclined with relation thereto, and a transverse loop extending from the base of the first-named arm and joining the same to the second-named arm.

5. A nose guard of pliable material comprising a nose bearing body plate, an attaching arm upon the plate, diverging arms of different lengths adjacent each other one at the base of the attaching arm, and an inclined loop connecting said arms, said nose bearing body plate being a downwardly directed loop extending from the first-named loop at its junction with one of said arms.

6. A nose guard of pliable material comprising a nose bearing body plate, a lateral attaching arm, a lever arm, diverging arms of different lengths, and a loop disposed at substantially right angles to and connecting said diverging arms, said arms being in substantially the same plane transversely of the lenses, said nose bearing body plate being a downwardly directed loop extending from said connecting loop near its junction with one of said arms.

In testimony whereof I have affixed my signature in presence of two witnesses.

WILLIAM T. HENDERSON.

Witnesses:
V. M. TEDFORD,
JOHN E. HOOD.

Copies of this patent may be obtained for five cents each, by addressing the "Commissioner of Patents, Washington, D. C."